(12) United States Patent
Sumada et al.

(10) Patent No.: US 6,439,753 B1
(45) Date of Patent: Aug. 27, 2002

(54) HEADLIGHT UNIT FOR A VEHICLE

(75) Inventors: Takashi Sumada; Koji Kano; Shigeru Kodaira; Koichi Shimamura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/539,715

(22) Filed: Mar. 31, 2000

(30) Foreign Application Priority Data

Mar. 31, 1999 (JP) ............................................ 11-091432

(51) Int. Cl.[7] ................................................ B60Q 1/04
(52) U.S. Cl. ...................... 362/475; 362/543; 362/517; 362/544; 362/476
(58) Field of Search ................................. 362/543, 544, 362/517, 240, 241, 247, 473, 475, 476, 464, 467, 468, 465, 282, 284, 322, 324, 286

(56) References Cited

U.S. PATENT DOCUMENTS

| 5,070,433 A | * 12/1991 | Zillgitt et al. ................ 362/286 |
| 5,117,335 A | * 5/1992 | Yamada ....................... 362/282 |
| 5,285,358 A | * 2/1994 | Watanabe et al. ........... 362/351 |
| 5,353,203 A | * 10/1994 | Bertling et al. .............. 362/243 |
| 5,702,173 A | * 12/1997 | Kawamura ................... 362/346 |
| 5,941,633 A | * 8/1999 | Saito et al. .................. 362/543 |
| 5,975,732 A | * 11/1999 | Tabata et al. ................ 362/539 |

FOREIGN PATENT DOCUMENTS

JP  2-136383  5/1990

* cited by examiner

Primary Examiner—Thomas M. Sember
(74) Attorney, Agent, or Firm—Birch, Stewart, Kolasch & Birch, LLP (57) ABSTRACT

A pair of right and left headlights are fitted with a front cowl. Each headlight has two lamps laterally arranged. A laterally inner one of the two lamps is a discharge lamp functioning as a low-beam emitting lamp, and a laterally outer one of the two lamps is a halogen lamp functioning as a high-beam emitting lamp. The halogen lamp is higher in position than the discharge lamp. Each headlight further has a reflector surface for the low beam and a reflector surface for the high beam. The reflector surface is larger in size than the reflector surface. A lens is provided on the front side of the reflector surfaces, and the width of a laterally inner portion of the lens is larger than the width of a laterally outer portion of the lens. The low beam emitted from the discharge lamp is reflected on the larger reflector surface to illuminate a wide area, and the high beam emitted from the halogen lamp is reflected on the smaller reflector surface to illuminate a spot area at a distant point.

16 Claims, 12 Drawing Sheets

HEADLIGHT UNIT FOR A VEHICLE

BACKGROUND OF THE INVENTION

1. Field of the Invention

The present invention relates to a headlight unit for a vehicle, and more particularly to a headlight unit suitable for improving light distribution of a low and high beams, and for improving the diverse intensity between the two beam types.

2. Background Art

It is known that a pair of right and left headlights may be supported to a cowling provided at a front portion of a vehicle. Each headlight includes a low-beam emitting lamp located at a laterally inner portion of the vehicle and a high-beam emitting lamp located at a laterally outer portion of the vehicle. The cowling is provided for the purpose of reducing an air resistance on the front portion of the vehicle at high-speed running to thereby improve running performance. However, the lateral arrangement of four lamps causes an increase in width of the cowling, which is disadvantageous from the viewpoint of the reduction in air resistance and is poor in outward appearance. Particularly, in the case of intending to obtain a sufficient light quantity from each headlight, the expansive diameter of a reflector causes a further increase in the width of the cowling.

A motorcycle solving the above problem by adopting a projector type headlight has been proposed (Japanese Patent Laid-open No. Hei 2-136383). The projector type headlight has a configuration such that light reflected on a reflector is passed through a convex lens and projected forward, thus reducing the size of the reflector to reduce the width of the cowling.

In the above conventional headlights, the position of light emission changes between the low beam and the high beam, thereby offering improvement in accenting each beam's intensity. However, since all the four lamps are light sources of the same kind, the accenting effect is low. Further, another problem is, it is difficult to obtain light distribution characteristics respectively suitable for the low beam and the high beam. That is, the low beam is required to illuminate a wide area at a relatively short distance, whereas the high beam is required to illuminate a narrow or spot area at a relatively long distance. However, such characteristics are difficult to obtain using conventional headlights.

Further, the projector type headlight has a problem such that its length along a beam axis is relatively large, so that the layout of parts, such as meters located behind the headlight, is limited.

SUMMARY OF THE INVENTION

It is accordingly an object of the present invention to provide a headlight unit for a vehicle which can improve the accenting effect in switching between the low beam and the high beam, can obtain proper light distribution characteristics for the low beam and the high beam, and can increase the degree of freedom of the layout of parts located behind the headlight.

In accordance with a first aspect of the present invention, there is provided a headlight unit for a vehicle, including a pair of right and left headlights provided at a front portion of the vehicle, each of the right and left headlights including a low-beam emitting lamp for emitting a low beam; a high-beam emitting lamp for emitting a high beam; a reflector having a reflector surface for reflecting the low beam emitted from the low-beam emitting lamp and a reflector surface for reflecting the high beam emitted from the high-beam emitting lamp; and a lens provided so as to commonly cover the low-beam emitting lamp and the high-beam emitting lamp; wherein the low-beam emitting lamp is located at a laterally inner position of the vehicle, and the high-beam emitting lamp is located at a laterally outer position of the vehicle higher in level than the low-beam emitting lamp; the reflector surface for the low-beam emitting lamp is larger in size than the reflector surface for the high-beam emitting lamp; and the lens has a laterally inner portion opposed to the reflector surface for the low-beam emitting lamp and a laterally outer portion opposed to the reflector surface for the high-beam emitting lamp, the laterally inner portion being larger in size than the laterally outer portion.

In accordance with a second aspect of the present invention, the low-beam emitting lamp comprises a discharge tube as a light source. In accordance with a third aspect of the present invention, the headlight unit further comprises a pair of right and left boosting devices interposed between the right and left headlights and respectively connected to the discharge tubes of the right and left headlights.

According to the first aspect, the low beam is reflected on the larger reflector surface to illuminate a wide area at a relatively short distance ahead of the vehicle, and the high beam is reflected on the smaller reflector surface to illuminate a narrow or spot area at a relatively long distance ahead of the vehicle. Further, the high beam and the low beam are directed at different heights, thereby obtaining a high accent effect in switching between the high beam and the low beam. Particularly, according to the second aspect, the discharge tube can produce strong light unlike a halogen lamp or the like, thereby allowing wide light distribution suitable for the low beam. Further, according to the third aspect, each boosting device is located near the corresponding discharge tube, so that a high-voltage shield wire required to ensure noise immunity can be shortened to thereby achieve more effective noise prevention. In addition, the boosting devices are located at a laterally central position of the vehicle, thereby obtaining a good balance of weight.

In accordance with a fourth aspect of the present invention, the reflector surface for the low-beam emitting lamp and the reflector surface of the high-beam emitting lamp are integrally formed; and each of the right and left headlights further comprises aiming means for pivotally moving the reflector in a vertical direction; a pivotal axis about which the reflector is pivotally moved being set in relation to the reflector surface for the low-beam emitting lamp so that a beam axis of the low-beam emitting lamp can be desirably adjusted. In accordance with a fifth aspect of the present invention, the aiming means comprises an electric motor for pivotally moving the reflector in the vertical direction.

According to the fourth aspect, the low beam whose luminous intensity is high can be accurately directed in a direction desired by an operator. Particularly, according to the fifth aspect, the aiming can be performed by the electric motor, thereby reducing the load on the operator and allowing accurate adjustment of the beam axis.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
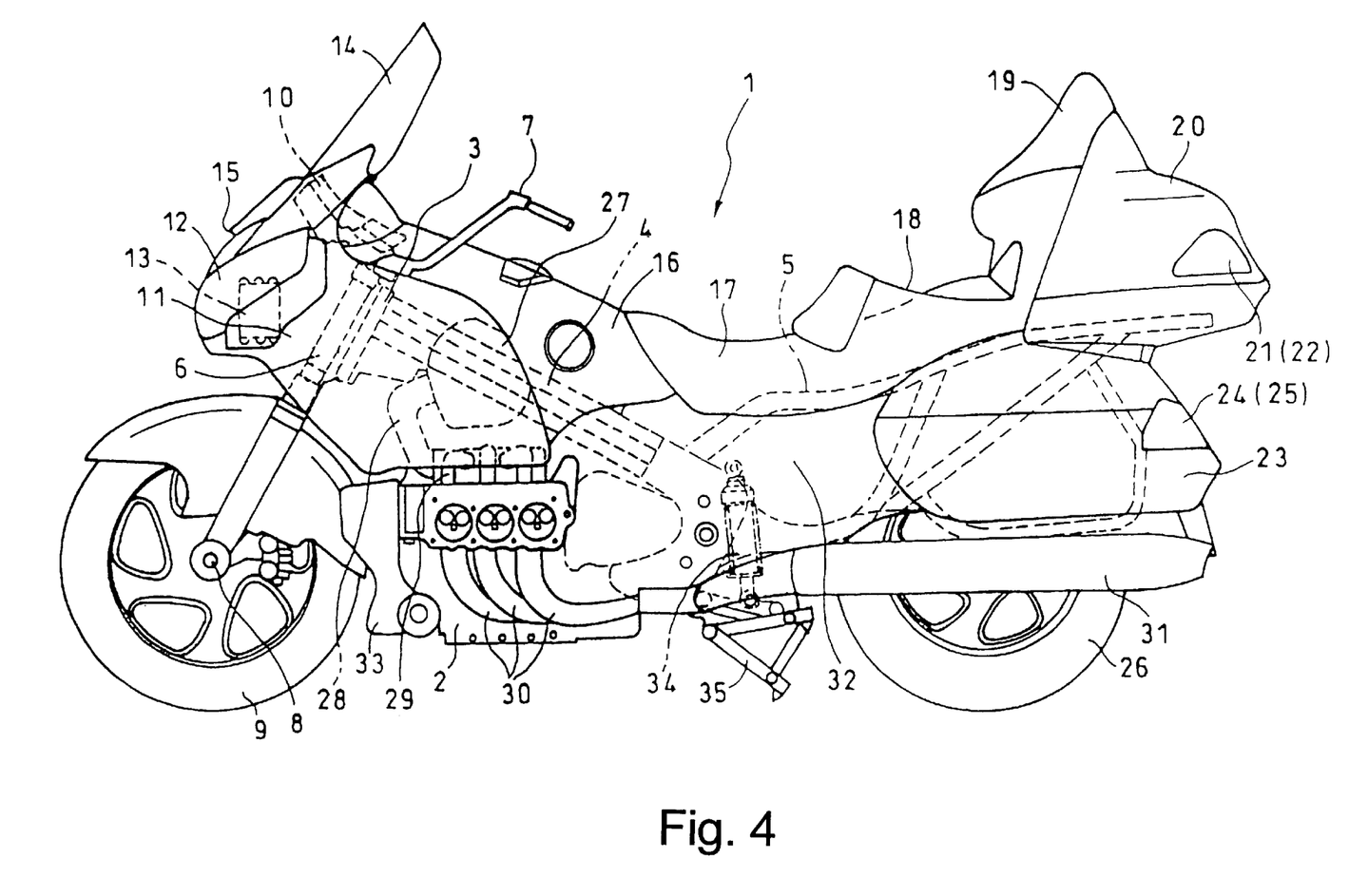
FIG. 4 is a side view illustrating the appearance of a motorcycle having a pair of right and left headlights each shown in FIG. 1.

The present invention will now be described with reference to the drawings. In the following description, the same or like parts will be denoted by the same reference numerals. FIG. 4 is a side view showing the appearance of a motorcycle 1 having a headlight according to a preferred embodiment of the present invention. As shown in FIG. 4, the motorcycle 1 (which will be hereinafter referred to as a "vehicle") has a horizontally opposed six-cylinder engine 2. The vehicle 1 has a frame structure consisting of a steering head 3, a twin-frame type main frame 4 extending rearward from the steering head 3 so as to be bifurcated, and a rear frame 5 extending rearward from the rear ends of the main frame 4. A front fork 6 composed of a pair of right and left pipes is pivotably supported to the steering head 3 so as to be steerable in opposite directions. A handle 7 is fixed to an upper end portion of the front fork 6, i.e., a top bridge connecting the upper ends of the right and left pipes of the front fork 6. A front axle 8 is connected between the lower ends of the front fork 6, and a front wheel 9 is rotatably supported to the front axle 8.

A meter unit 10 including a meter panel and a controller is provided on the front side of the handle 7. Reference numeral 11 denotes a front cowl for covering a front portion of the vehicle 1. A lens (clear lens) 12 for a headlight to be hereinafter described is mounted on the front side of the front cowl 11. A boosting device 13 (ballast) for a discharge lamp used in the headlight is accommodated inside the front cowl 11. A windscreen 14 is mounted on an upper portion of the front cowl 11. An air inlet opening 15 is formed in the vicinity of a mounting portion of the windscreen 14.

A fuel tank 16 is provided on the main frame 4. A rider seat 17 and a passenger seat 18 are mounted on the rear frame 5 and located behind the fuel tank 16. The rider seat 17 and the passenger seat 18 are integrally formed, and the passenger seat 18 has a backrest 19. A rear trunk 20 are provided behind the backrest 19. A rear stop lamp 21 and a winker light 22 is provided at a rear portion of the rear trunk 20. A side trunk 23 is provided below the rear trunk 20 so as to interpose a rear wheel 26. Another rear stop lamp 24 and winker light 25 are provided at a rear portion of the side trunk 23.

An air cleaner 27 is provided below the fuel tank 16 at its front portion. A throttle body 28 extends from a front portion of the air cleaner 27 to an intake manifold 29. The intake manifold 29 has six branch pipes respectively connected to the horizontally opposed six cylinders of the engine 2, and a fuel injection device (not shown) is provided on each branch pipe upstream of the corresponding cylinder. An exhaust manifold 30 extends rearward from the engine 2 and is connected to a muffler 31.

A side cover 32 is provided below the rider seat 17 so as to cover the opposite sides of the vehicle frame, and a front lower cowl 33 is provided in front of the engine 2. A rear cushion 34 is provided below the rider seat 17. The rear cushion 34 is connected to a hydraulic unit (not shown) for adjusting a spring force with a motor to control an initial load to a suspension according to a rider's weight. Reference numeral 35 denotes a stand for use in placing the vehicle 1 for support in its upright position.

Figure 1:
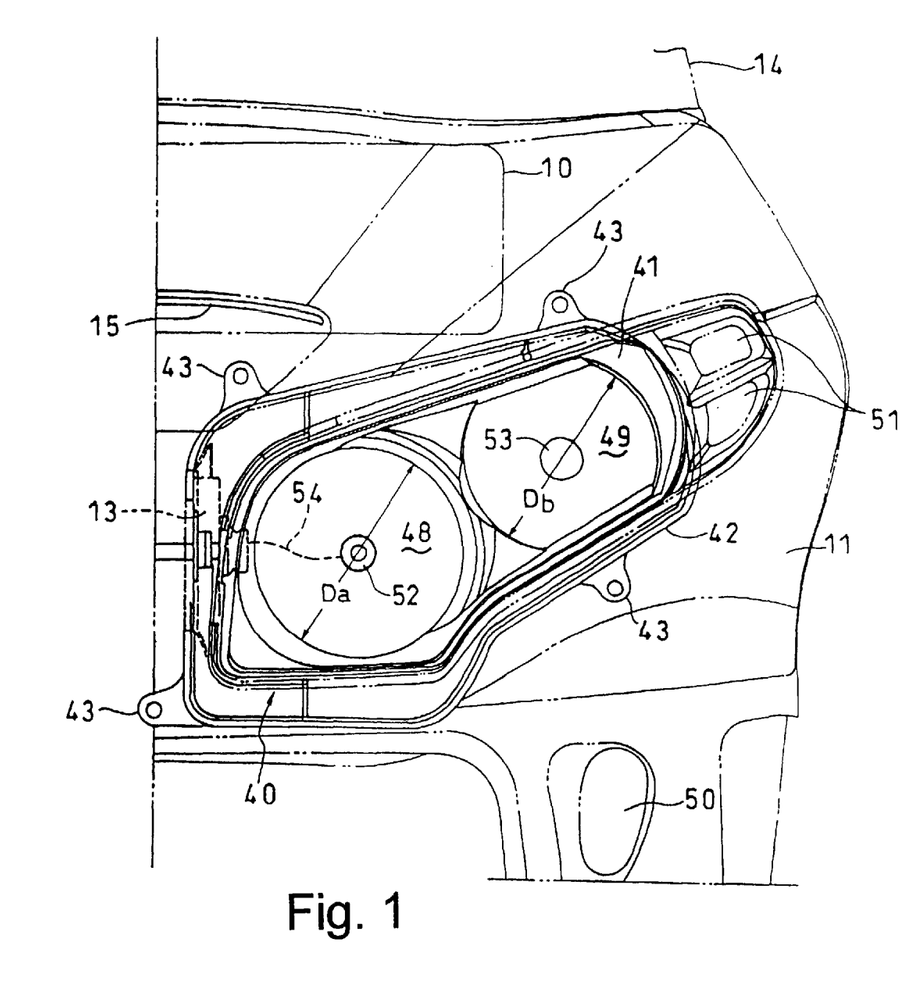
FIG. 1 is a front elevation view illustrating a headlight according to a preferred embodiment of the present invention.
Figure 2:
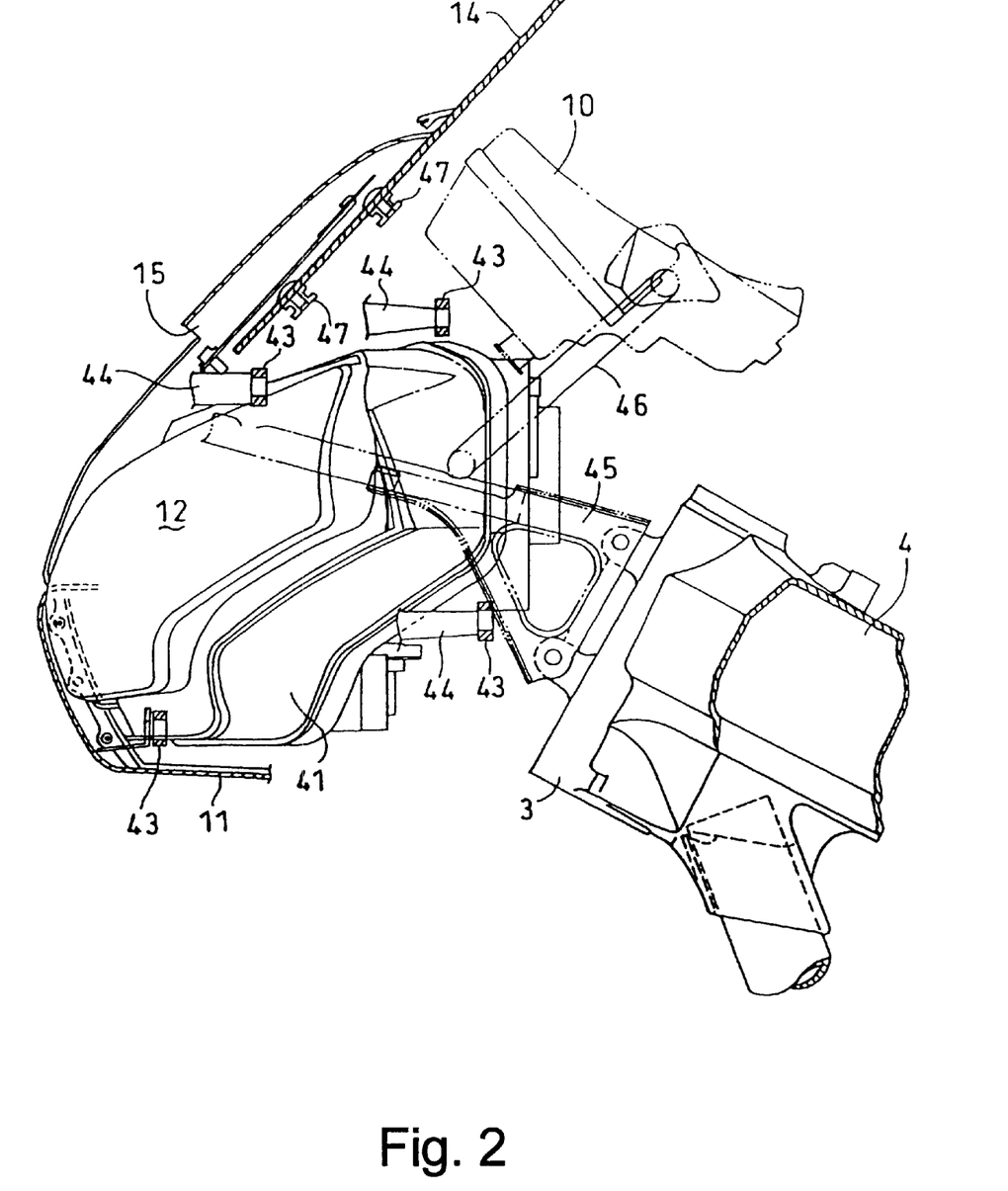
FIG. 2 is a sectional side view of the headlight shown in FIG. 1.
Figure 3:
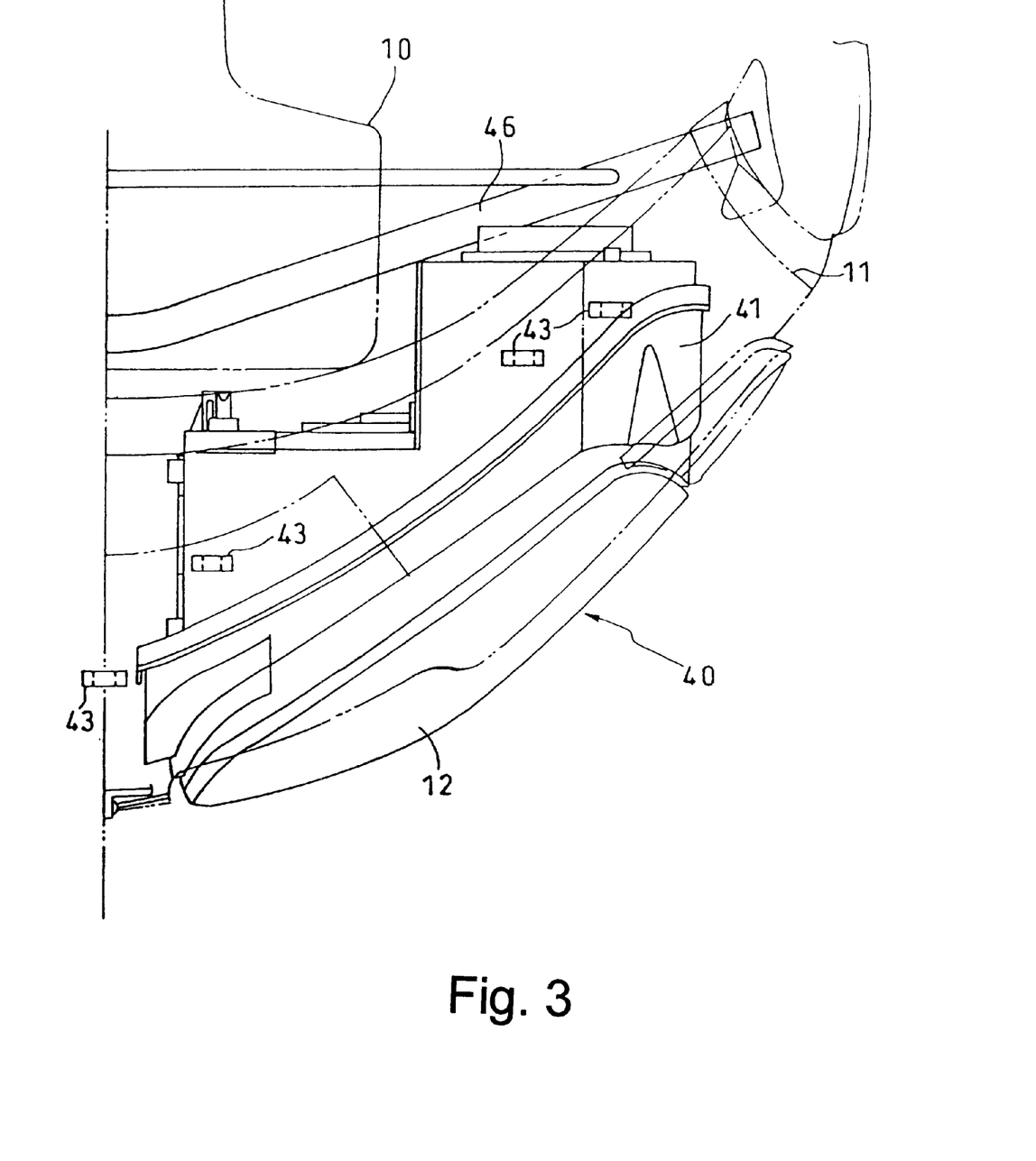
FIG. 3 is a plan view of the headlight shown in FIG. 1.

The structure of a front portion of the vehicle 1 will now be described. FIG. 1 is a front elevation of a part of the vehicle 1, FIG. 2 is a sectional side view of a part shown in FIG. 1, and FIG. 3 is a plan view of the part shown in FIG. 1. In FIGS. 1 to 3, the same reference numerals as those in FIG. 4 denote the same or like parts. While only the left half of the vehicle 1 is shown in FIGS. 1 to 3, the structure of the right half of the vehicle 1 is similar to that of the left half of the vehicle 1.

A headlight 40 is provided at a front portion of the front cowl 11 so that the lens 12 faces forward of the vehicle 1. The headlight 40 has the lens 12, a reflector 41 mounted on the rear side of the lens 12, and a cover or case 42 for covering the reflector 41 from its rear side. Four mounting portions 43 project from the outer periphery of the case 42. The mounting portions 43 of the case 42 are fixed to bosses 44 formed on the inner surface of the front cowl 11, thereby fixedly supporting the headlight 40 to the front cowl 11. As will be hereinafter described, the reflector 41 is pivotably supported to the case 42, so as to allow the aiming of the headlight 40.

A bracket 45 projecting forward is mounted on the steering head 3, and a stay 46 is supported to the bracket 45. The front end of the bracket 45 and the lateral ends of the stay 46 are connected to the front cowl 11, thereby fixing the front cowl 11 through the steering head 3 to the main frame 4. The front cowl 11 is formed with a lower air scoop 50 and an upper air scoop 51. The windscreen 14 is mounted to the front cowl 11 so as to be vertically adjustable in position by means of members 47.

As shown in FIG. 1, the reflector 41 of the headlight 40 has two reflector surfaces 48 and 49 each having a circular shape as viewed in front elevation. The reflector surface 48 has a diameter Da, and the reflector surface 49 has a diameter Db smaller than the diameter Da. That is, the diameter Da of the reflector surface 48 formed at a laterally inner position of the vehicle 1 is larger than the diameter Db of the reflector surface 49 formed at a laterally outer position of the vehicle 1. For example, the diameter Da is set to 120 mm, and the diameter Db is set to 100 mm. The laterally outer reflector surface 49 is set higher in position than the laterally inner reflector surface 48.

In concert with the shape of the reflector 41 having the reflector surfaces 48 and 49 different in diameter as mentioned above, the lens 12 has such a shape that a laterally inner portion of the lens 12 is larger in width than a laterally outer portion of the lens 12. A discharge lamp 52 containing xenon gas, mercury, and mercury halide is mounted at the center of the reflector surface 48, and a halogen lamp 53 is mounted at the center of the reflector surface 49. The discharge lamp 52 and the halogen lamp 53 are connected to a power source. In particular, the discharge lamp 52 is connected through a high-voltage shield wire 54 to the ballast 13 as a boosting and light holding control unit, and the ballast 13 is connected to the power source.

The larger reflector surface 48 is suitable for illumination of a wide area, and the discharge lamp 52 mounted on the reflector surface 48 functions as a lamp for emitting a low beam. On the other hand, the smaller reflector surface 49 is suitable for illumination of a spot area, and the halogen lamp 53 mounted on the reflector surface 49 functions as a lamp for emitting a high beam.

Figure 5:
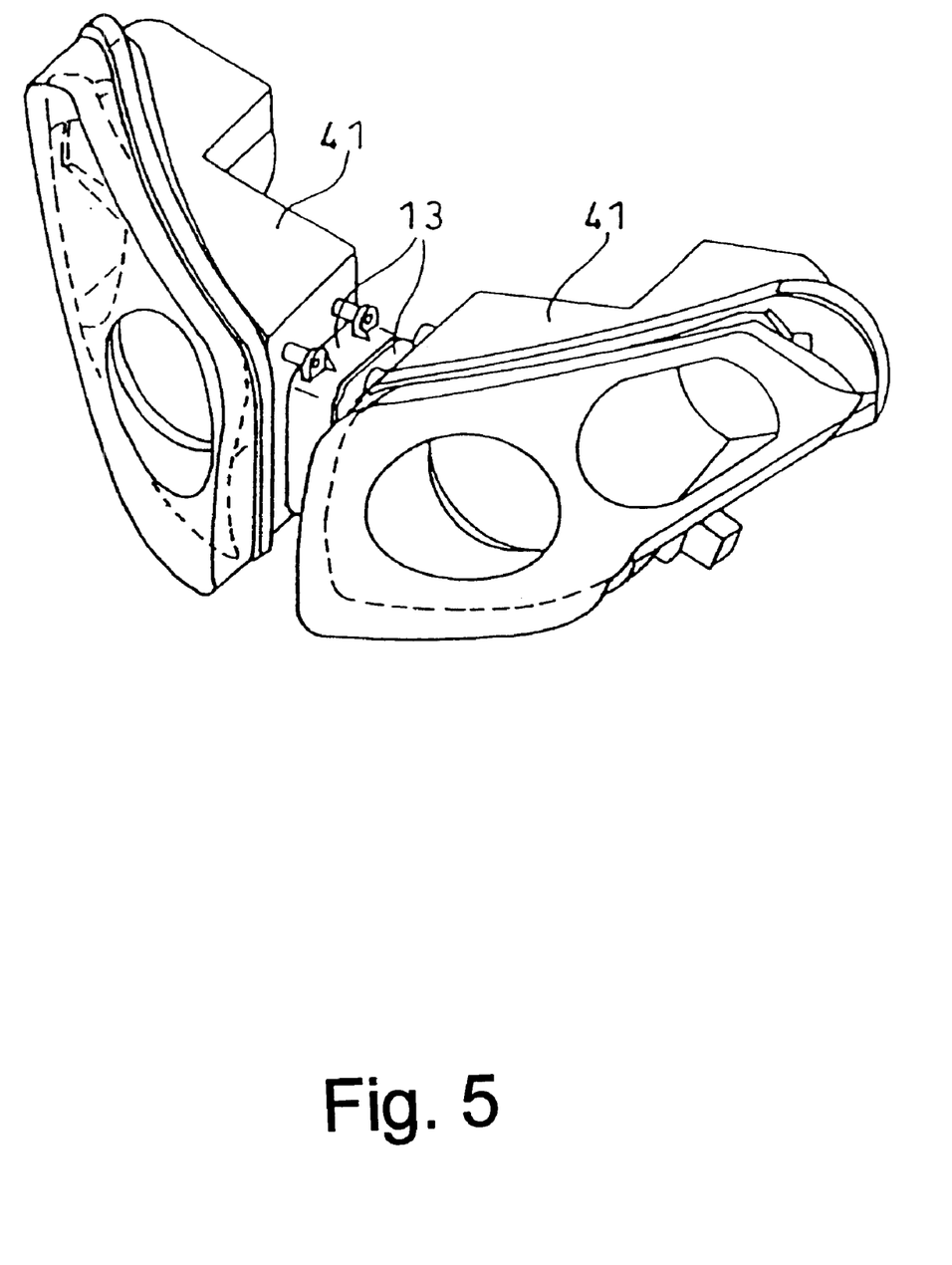
FIG. 5 is a perspective view of reflectors of the right and left headlights according to the preferred embodiment.
Figure 6:
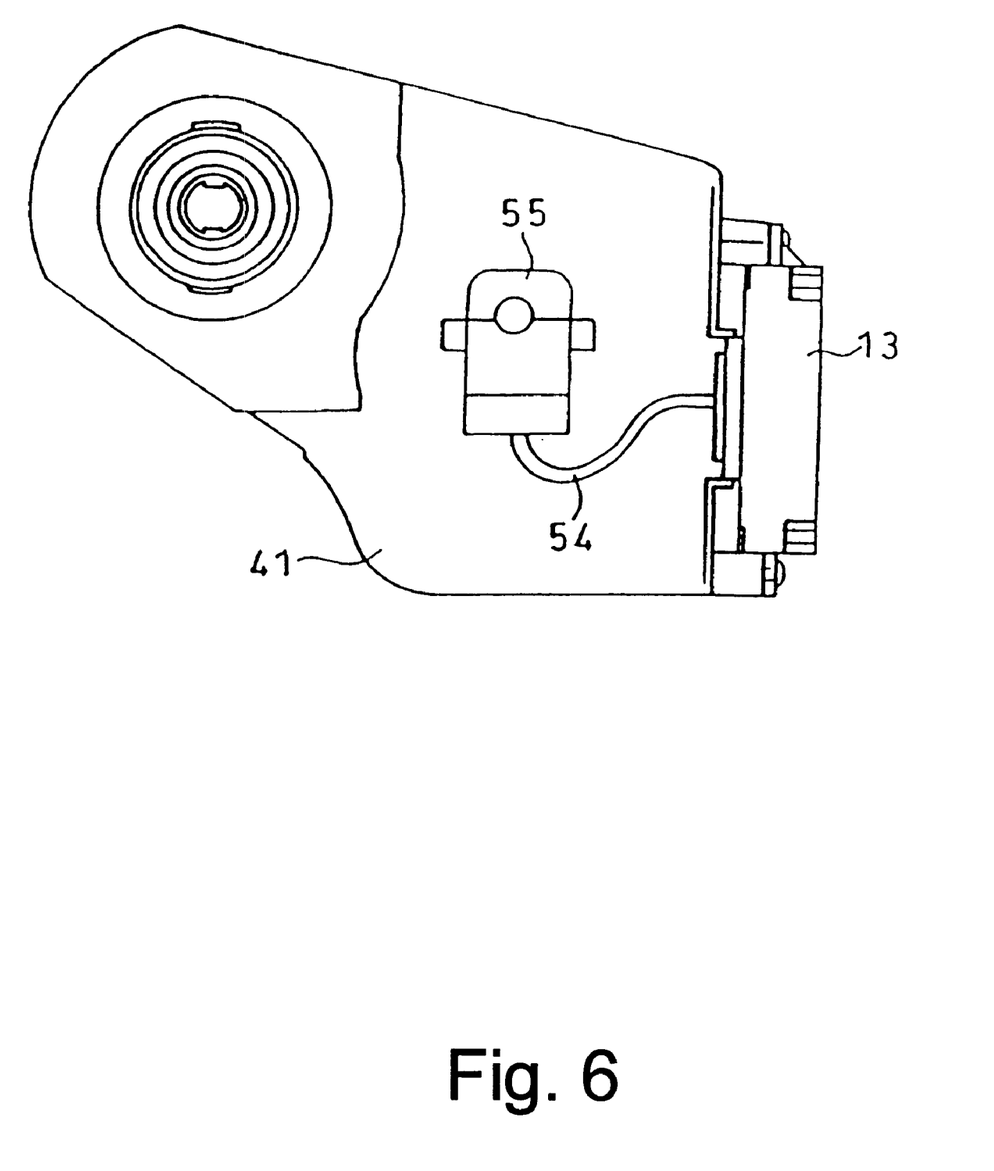
FIG. 6 is a rear elevation of the reflector of the left headlight shown in FIG. 5.

The lighting control of the discharge lamp 52 will now be described. FIG. 5 is a perspective view of the reflectors 41 of the right and left headlights 40, and FIG. 6 is a rear elevation of the left headlight 40. As shown in FIGS. 5 and 6, the two ballasts 13 are located between the right and left reflectors 41, in which one of the two ballasts 13 is connected to the discharge lamp 52 on the right reflector 41, and the other ballast 13 is connected to the discharge lamp 52 on the left reflector 41. Each ballast 13 has a transformer, so that it is relatively heavy. However, since the two ballasts 13 are interposed between the two headlights 40, a good balance of weight can be ensured.

Each ballast 13 is connected to the corresponding discharge lamp 52 by using the high-voltage shield wire 54 having noise immunity. Further, a socket for the discharge lamp 52 is connected directly to the reflector 41, and is covered with a socket cover 55, so as to enhance noise immunity.

Figure 7:
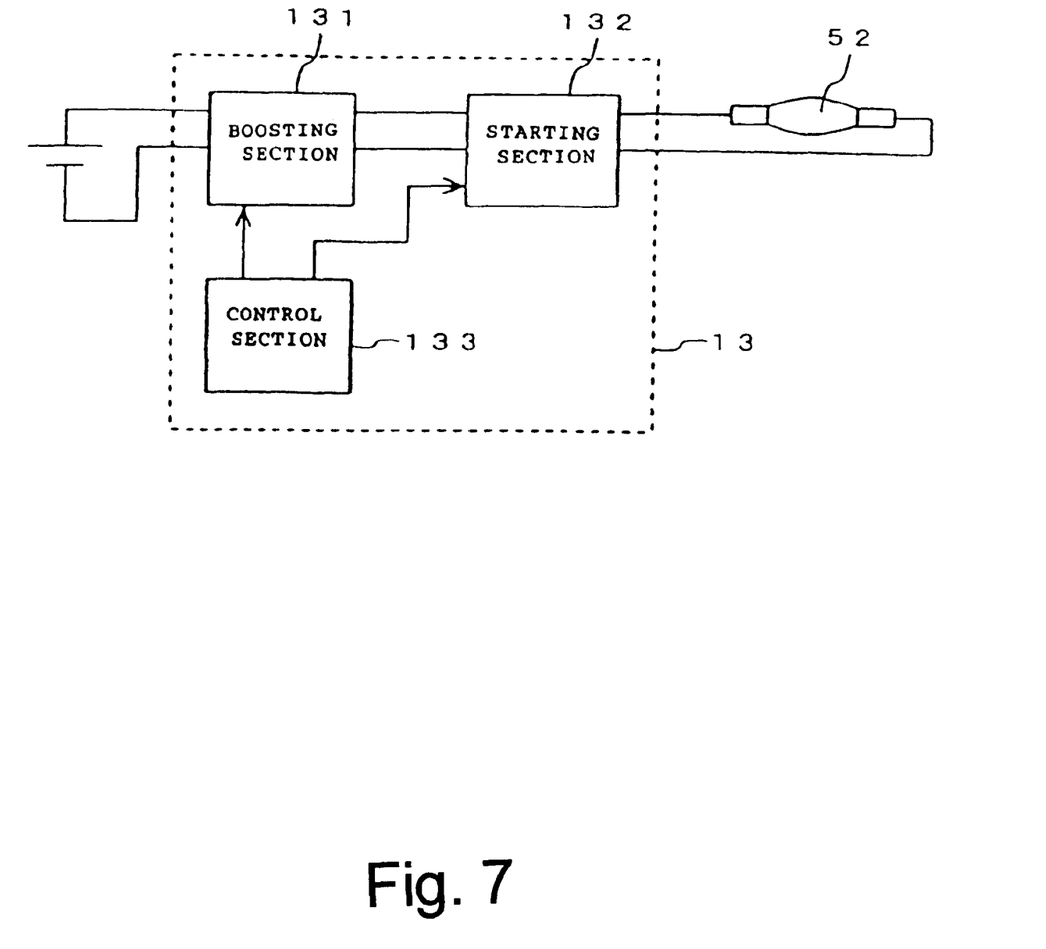
FIG. 7 is a block diagram illustrating the hardware configuration of a boosting device for a discharge lamp.
Figure 8:
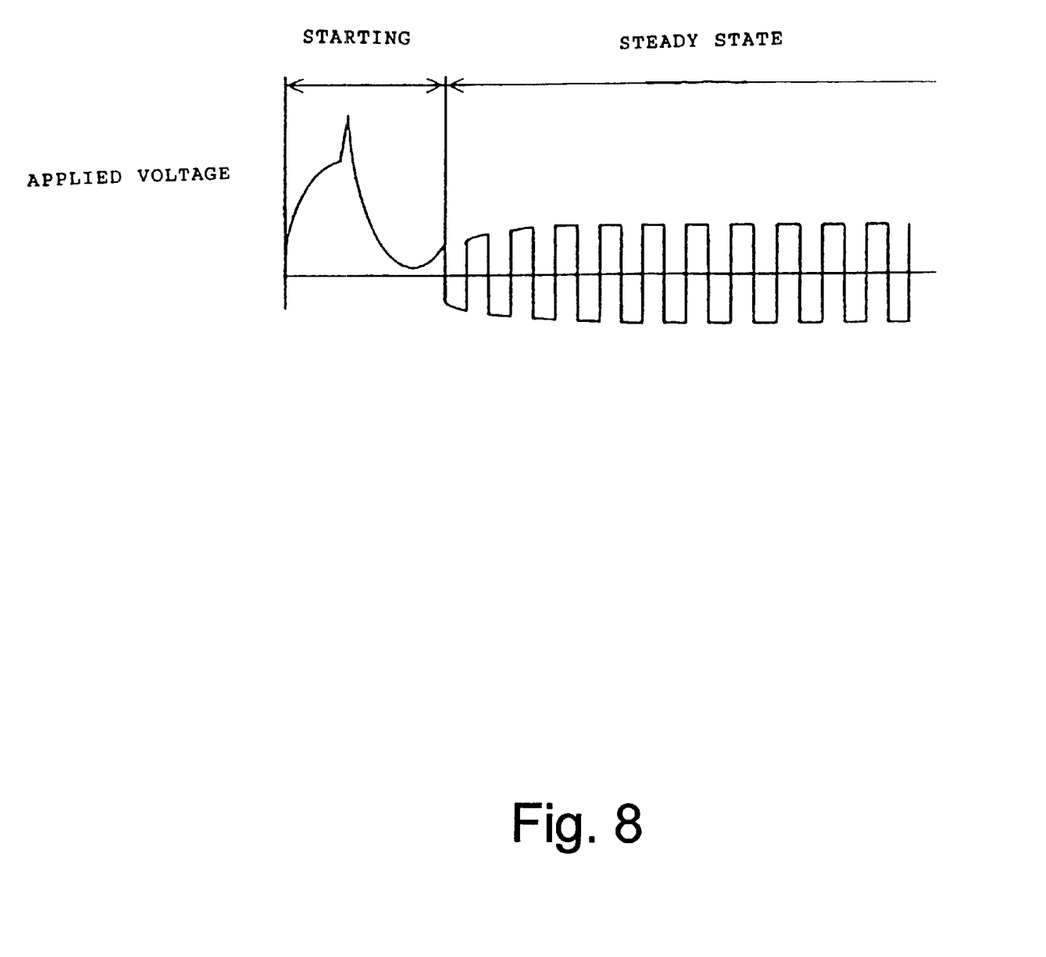
FIG. 8 is a time chart illustrating an applied voltage to the discharge lamp under the control of the boosting device.

FIG. 7 is a block diagram illustrating the hardware configuration of each ballast 13, and FIG. 8 is a time chart illustrating an applied voltage to the discharge lamp 52 under the control by the ballast 13. As shown in FIG. 7, the ballast 13 is composed of a boosting section 131, a starting section 132, and a control section 133 for supplying control signals to the boosting section 131 and the starting section 132. The boosting section 131 is connected to a power source of 12 V DC, and the starting section 132 is connected to the discharge lamp 52, or a metal halide lamp.

Referring to FIG. 8, a voltage (e.g., 400 V for 0.25 sec) increased by the boosting section 131 is applied to the discharge lamp 52 by energizing the starting section 132, resulting in xenon luminescence. After a predetermined elapsed time (e.g., 0.5 sec) from the occurrence of the xenon luminescence, an AC voltage (e.g., 80 V with 400 Hz) lower than the applied voltage at starting is applied to the discharge lamp 52, thereby continuing to generate an arc in the mercury vapor and the metal halide contained in the discharge lamp 52 to form a steady state.

Figure 9:
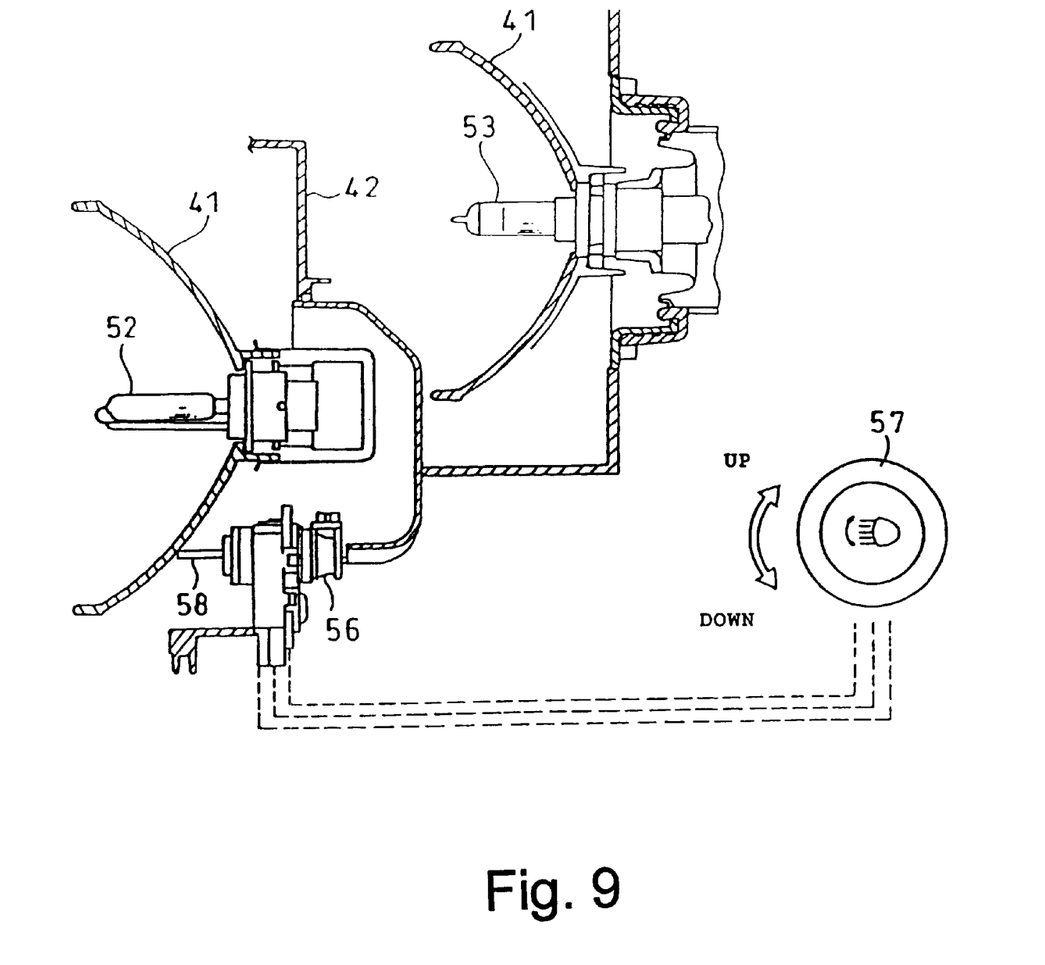
FIG. 9 is a schematic view illustrating the concept of an aiming mechanism.

An aiming mechanism for each headlight 40 will now be described. Each headlight 40 according to this preferred embodiment employs an aiming mechanism for vertically adjusting the beam axes of the discharge lamp 52 and the halogen lamp 53 of each headlight 40. FIG. 9 is a schematic view illustrating the concept of the aiming mechanism. As shown in FIG. 9, an aiming motor 56 is fixed to the case 42 of the headlight 40, and an adjusting knob 57 is connected to the aiming motor 56. By rotating the adjusting knob 57 upward or downward, the motor 56 is operated according to the amount of rotation of the adjusting knob 57, and a shaft 58 is moved forward or backward by the motor 56. The front end of the shaft 58 is engaged with the back surface of the reflector 41, so that the reflector 41 is vertically tilted by the horizontal movement of the shaft 58. As a result, the beam axes of the discharge lamp 52 and the halogen lamp 53 mounted on the reflector 41 are vertically tilted. A specific structure of the aiming mechanism mentioned above will now be described.

Figure 10:
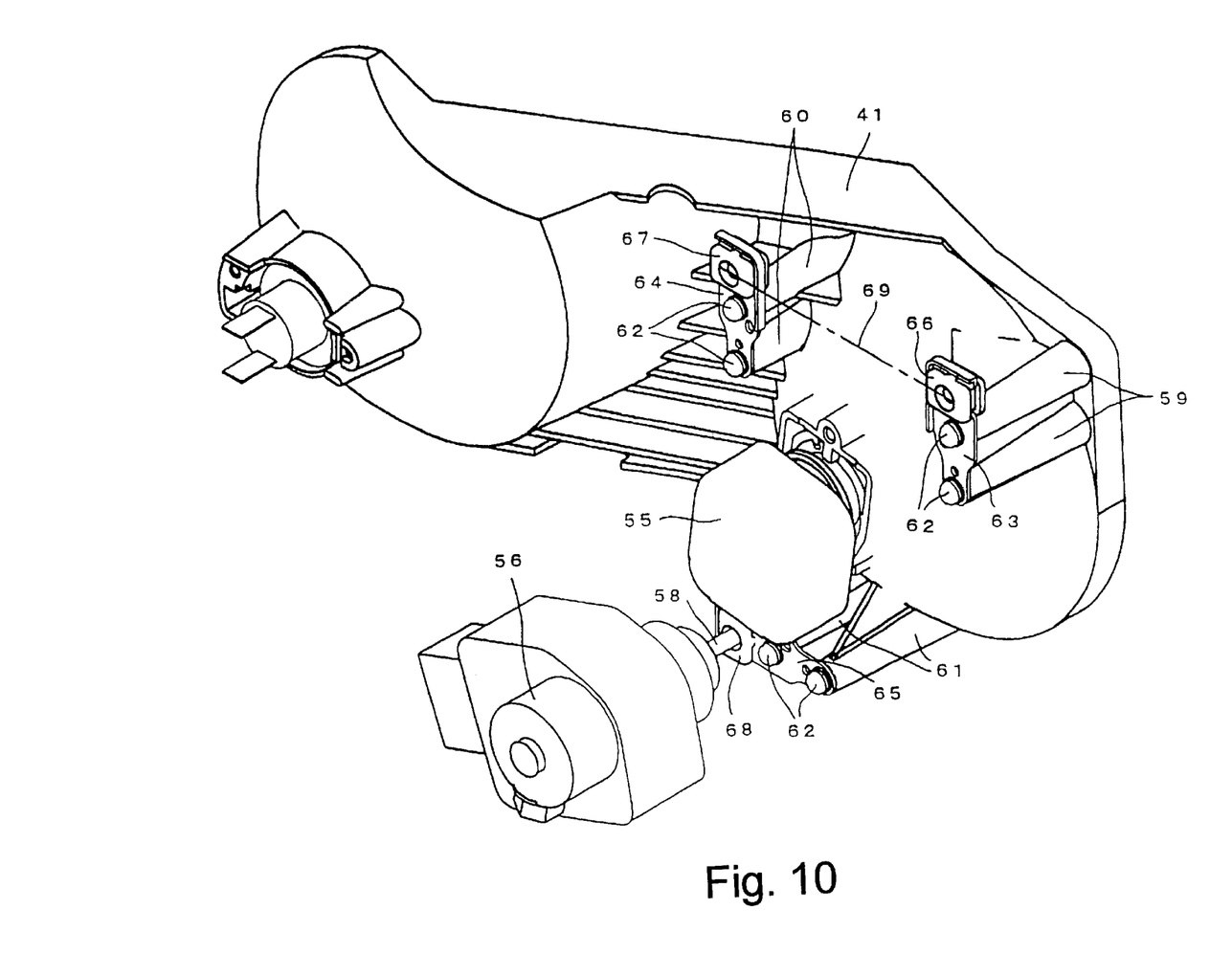
FIG. 10 is a perspective view of the reflector of the left headlight as viewed from its back side.
Figure 11:
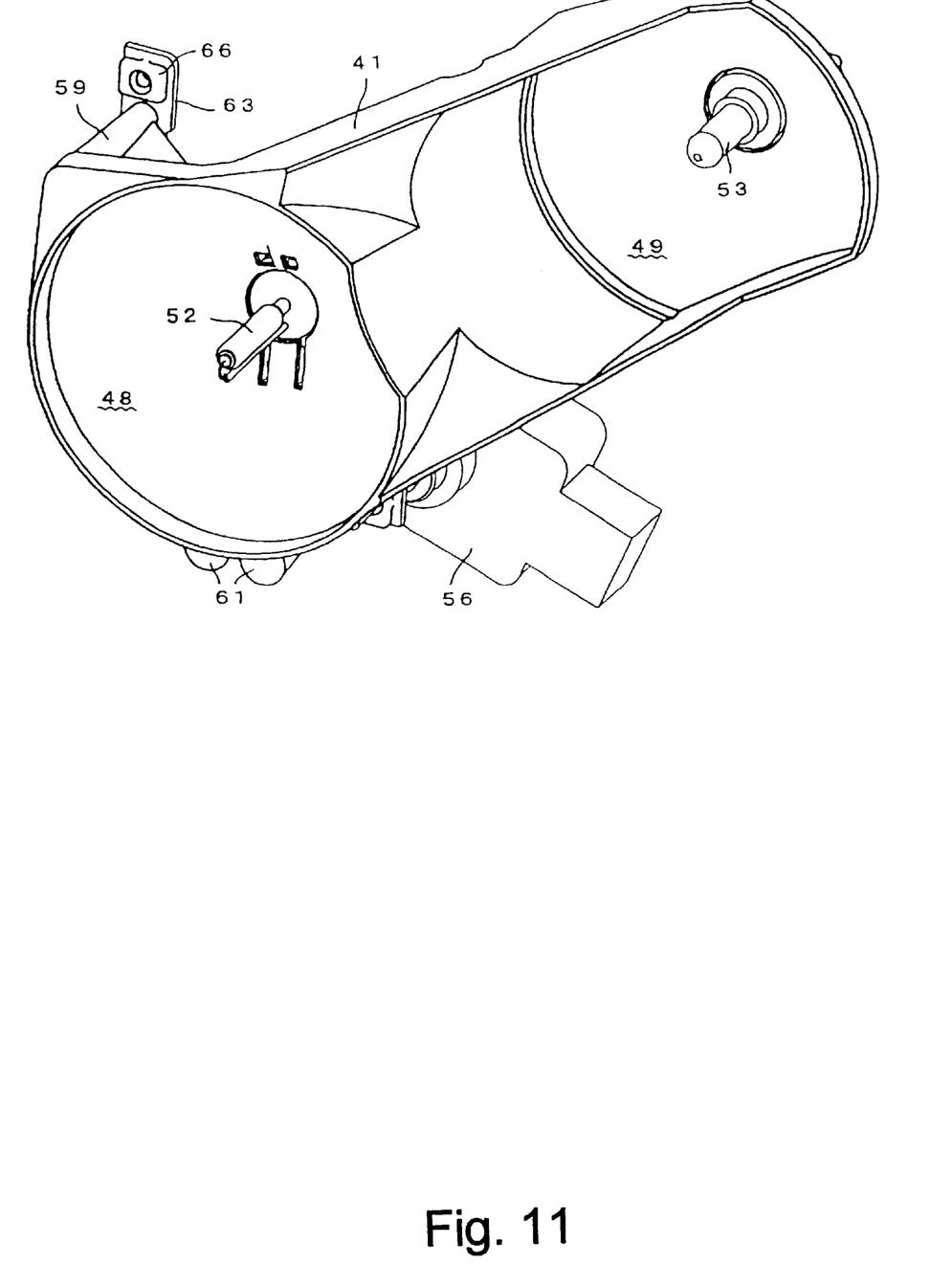
FIG. 11 is a view similar to FIG. 10, as viewed from the front side.
Figure 12:
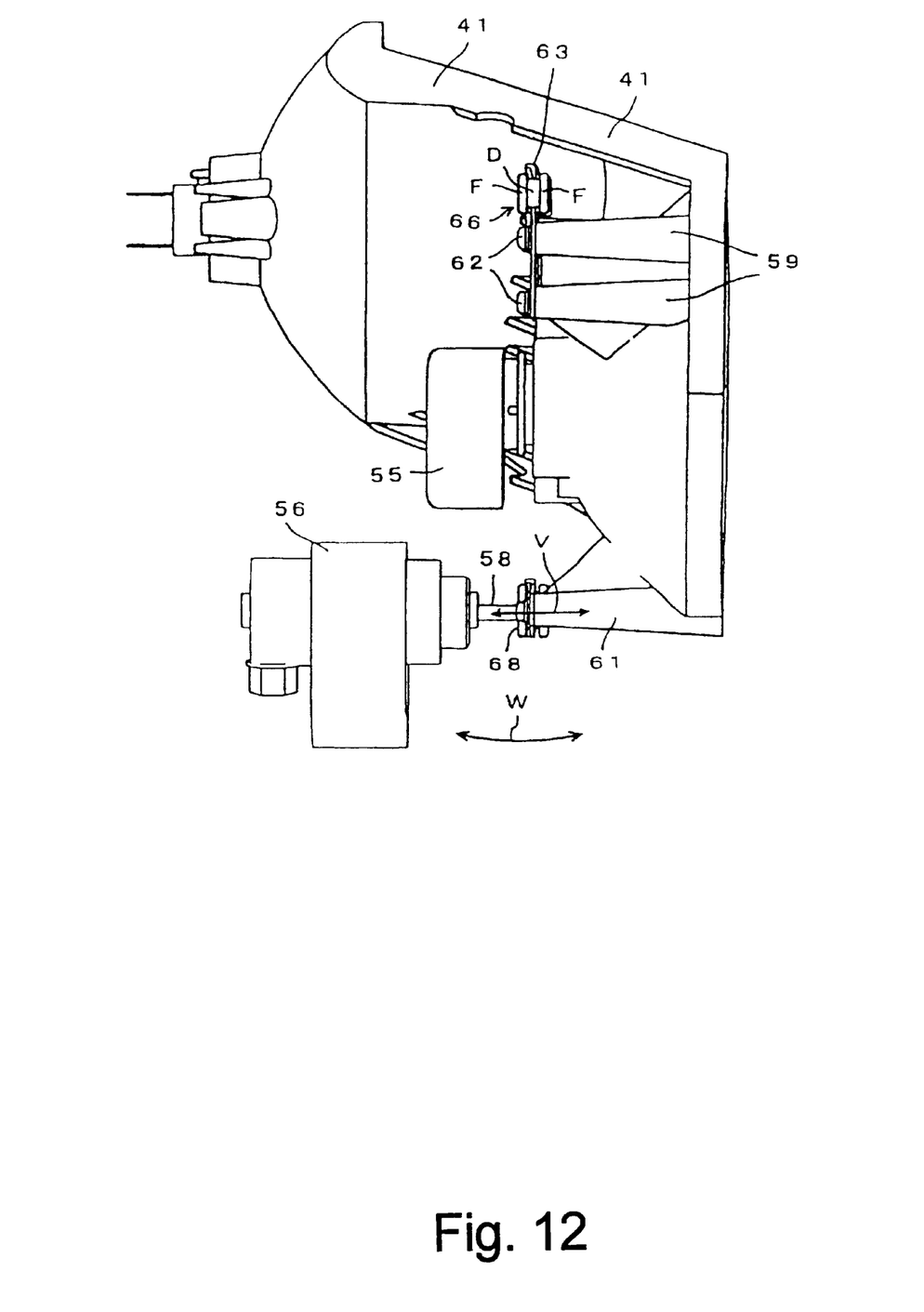
FIG. 12 is a side view of the reflector shown in FIG. 10.

FIG. 10 is a perspective view of the reflector 41 of the left headlight 40 as viewed from its back side, FIG. 10 is a perspective view of the reflector 41 of the left headlight 40 as viewed from its front side, and FIG. 12 is a side view of the reflector 41 shown in FIG. 10. As shown in FIGS. 10 to 12, three pairs of stems 59, 60, and 61 are formed on the back side of the reflector surface 48 of the reflector 41. Three attachment metal fittings 63, 64, and 65 are mounted on the rear ends of the stems 59, 60, and 61, respectively, by means of set screws 62. Three bushings 66, 67, and 68 each formed of an elastic material such as rubber are engaged with the attachment metal fittings 63, 64, and 65, respectively. As understood from FIG. 12, the bushing 66 has a body portion D and two flange portions F formed at the opposite ends of the body portion D. The body portion D is fitted with a slot formed in the attachment metal fitting 63, and the flange portions F are in abutment against the opposite surfaces of the attachment metal fitting 63. The other bushings 67 and 68 are similar to the bushing 66, and are similarly mounted on the other attachment metal fittings 64 and 65, respectively.

The bushings 66 and 67 are held by the cover 42 covering the reflector 41 from its back side, and a straight line 69 connecting the centers of the body portions D of the bushings 66 and 67 acts as an axis of pivotal movement for aiming of the reflector 41 in opposite directions shown by a double-headed arrow W in FIG. 12. On the other hand, the shaft 58 of the motor 56 is engaged with the bushing 68, so that the bushing 68 is horizontally movable in opposite directions shown by a double-headed arrow V in FIG. 12 by the horizontal movements of the shaft 58 driven by the motor 56. Accordingly, the reflector 41 is vertically tilted about the pivotal axis 69 to effect the aiming of the headlight 40.

Thus, the pivotal axis (the straight line 69) for the aiming is provided in relation to the reflector surface 48 for the low beam, thereby improving the accuracy of illumination especially by the low beam. The reason for provision of the pivotal axis 69 for aiming in relation to the reflector surface 48 for the low beam is to accurately illuminate a rider demanded area with the low beam emitted from a discharge tube as a light source with strong luminescence.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A headlight unit for a vehicle having right and left headlights provided at a front portion of the vehicle, each of said right and left headlights comprising:

a low-beam emitting lamp for emitting a low beam;

a high-beam emitting lamp for emitting a high beam;

a reflector having a first reflector surface for reflecting said low beam emitted from said low-beam emitting lamp and a second reflector surface for reflecting said high beam emitted from said high-beam emitting lamp; and a lens provided so as to commonly cover said low-beam emitting lamp and said high-beam emitting lamp;

wherein said low-beam emitting lamp is located more toward a center of the vehicle as compared to said high-beam emitting lamp, and said high-beam emitting lamp is located more toward a lateral side of the vehicle as compared to said low-beam emitting lamp;

wherein said high-beam emitting lamp is positioned higher, relative to a ground level supporting the vehicle, as compared to a height of said low-beam emitting lamp;

said first reflector surface for said low-beam emitting lamp is larger in size than said second reflector surface for said high-beam emitting lamp; and said lens has a laterally inner portion opposed to said first reflector surface for said low-beam emitting lamp and a laterally outer portion opposed to said second reflector surface for said high-beam emitting lamp, said laterally inner portion being larger in size than said laterally outer portion.

2. A headlight unit for a vehicle according to claim 1, wherein said low-beam emitting lamp comprises a discharge tube as a light source.

3. A headlight unit for a vehicle according to claim 2, further comprising a pair of right and left boosting devices interposed between said right and left headlights and respectively connected to said discharge tubes of said right and left headlights.

4. A headlight unit for a vehicle according to claim 1, wherein said first reflector surface for said low-beam emitting lamp and said second reflector surface for said high-beam emitting lamp are integrally formed, and each of said right and left headlights further includes an aiming unit for pivotally moving said reflector in a vertical direction, a pivotal axis about which said reflector is pivotally moved being set in relation to said first reflector surface for said low-beam emitting lamp so that a beam axis of said low-beam emitting lamp can be desirably adjusted.

5. A headlight unit for a vehicle according to claim 4, wherein said aiming unit comprises an electric motor for pivotally moving said reflector in the vertical direction.

6. A motorcycle headlight unit, comprising:

a plurality of light emitting lamps;

at least one reflector body for housing said plurality of light emitting lamps; and a lens member for covering said plurality of light emitting lamps, said lens member being fixedly attached to a front face portion of said at least one reflector body;

wherein said at least one reflector body has first and second reflector surfaces defined thereon, said first reflector surface having a first predetermined diameter and said second reflector surface having a second predetermined diameter, said first predetermined diameter being greater than said second predetermined diameter, and said second reflector surface being set at a higher position, relative to a ground level supporting the motorcycle, than said first reflector surface.

7. The headlight unit for a vehicle according to claim 1, wherein said second reflector surface for said high-beam emitting lamp is positioned higher than said first reflector surface for said low-beam emitting lamp.

8. The headlight unit for a vehicle according to claim 1, wherein said second reflector surface for said high-beam emitting lamp is diagonally offset from said first reflector surface for said low-beam emitting lamp.

9. The headlight unit according to claim 6, wherein said at least one reflector body is formed having a stepped structure including first and second steps, wherein said first step is located more toward a front of the motorcycle as compared to said second step, which is located more toward a rear of the motorcycle.

10. The headlight unit according to claim 7, wherein said first reflector surface is located on said first step of said stepped structure, and said second reflector surface is located on said second step of said stepped structure.

11. The headlight unit according to claim 6, wherein said first reflector surface receives a low-beam emitting lamp from said plurality of light emitting lamps and said second reflector surface receives a high-beam emitting lamp from said plurality of light emitting lamps.

12. The headlight unit according to claim 6, wherein said at least one reflector body are two such reflector bodies operatively connected via a connection member.

13. The headlight unit according to claim 12, wherein said connection member comprises a ballast positioned on lateral portions of each reflector body, respectively, each ballast being in signal connection with a respective one of said plurality of light emitting lamps.

14. The headlight unit according to claim 6, wherein said reflector body is tiltable via an actuateable member positioned to contact a surface of said reflector body when a tilting control is initiated.

15. The headlight unit according to claim 6, wherein said first diameter is 120 mm and said second diameter is 100 mm.

16. The headlight unit according to claim 6, wherein said second reflector surface is diagonally offset from said first reflector surface.

* * * * *